Oct. 20, 1959  H. W. STRATFORD  2,909,534
VERTICAL CONTACTOR WITH FEATURES
Filed April 3, 1957  2 Sheets-Sheet 1

INVENTOR.
Herbert W. Stratford
BY
Thos E Scofield
ATTORNEY.

United States Patent Office 2,909,534
Patented Oct. 20, 1959

2,909,534

VERTICAL CONTACTOR WITH FEATURES

Herbert W. Stratford, Kansas City, Kans., assignor to Stratford Engineering Corporation, Kansas City, Mo., a corporation of Delaware Application April 3, 1957, Serial No. 650,467

9 Claims. (Cl. 260—400)

This invention relates to methods and apparatus for conducting exothermic or endothermic chemical reactions between two or more reactants while simultaneously heat exchanging the reaction product and refers more particularly to such methods and apparatus wherein the reaction and the heat exchanging thereof both take place in a single vessel.

The invention relates also to methods and apparatus for manufacturing surface active agents such as wetting, emulsifying, dispersing, penetrating and deterging agents which contain salts of organics sulphonic acids as well as to improvements in the neutralization of an organic sulphonic acid mix which permit maintaining the temperature of the reacting materials effectively constant despite the large amount of heat liberated in the reaction.

This invention is an improvement over the methods and apparatus shown in United States Patents No. 2,690,446, "Control of Chemical Reactions," and No. 2,655,435, "Chemical Reaction Tower," both to Lowell A. Ledgett. This application is a continuation-in-part of my application Serial No. 573,862, entitled "Mixing Vessel," filed March 26, 1956.

Previously, various methods and apparatus have been provided for conducting exothermic chemical reactions which must be heat exchanged to remove excess heat therefrom to avoid deterioration of the reaction product. Some of said methods have been carried out in single vessels, as set forth in the two patents to Ledgett above. The disadvantages of conventionally known methods and apparatus are legion.

For example, any apparatus previously provided has been necessarily much too large, too complex and requires too great a circulating inventory of reaction product therein. In such conventional processes, the heat exchanging step is extremely inefficient as well as too slow and thus there is insufficient temperature control of the reaction with resultant lesser control of the nature and quality of the product. Specifically referring to the Ledgett apparatus, an excessively large flash volume is required because the spray tower therein employed is quite inefficient and, additionally, the apparatus requires too great a height to achieve sufficient hydraulic head to keep the impeller submerged.

Conventional apparatus additionally does not permit sequential input of the reactants with sequential mixing thereof. It is well known that conventional apparatus available cannot provide sufficient differential pressure head across the circulating means to handle high viscosity or high specific gravity materials and thus cannot handle as high a percentage as desired of solid concentration and, as well, must work at a lower temperature for a given material. Further, the actual mechanical mixing of reactants in the cyclic reaction product stream is insufficiently thorough and strings of unreacted reactants circulate within the system causing hot spots and local deterioration points in the product stream.

The neutralization of organic sulphonic acids suitable for use as surface-active agents is an exothermic reaction which liberates a very substantial amount of heat. If this heat is not effectively dissipated, the temperature of the reacting mixture may rise sufficiently to cause excessive deterioration of the product, especially if pH is not maintained closely throughout the reaction mixture by rapid and complete mixing of the reactants. Serious operating difficulties may also be encountered in this and other exothermic reactions if temperature is not controlled.

Therefore, an object of the invention is to provide a method of conducting exothermic chemical reactions and heat exchanging them within a single vessel wherein the reactants are sequentially placed in a cyclic flowing stream of reaction product with mixing steps following each of the reactant input steps whereby to achieve not only complete mixing of the reactants with the cyclic reaction product stream but also to contact the reactants one with the other as completely as possible.

Another object of the invention is to provide method and apparatus as described wherein absolute and complete mixing of the reactants in the reaction product stream is accomplished within a single cyclic pass through the vessel whereby no strings or streams of unreacted reactant are permitted in the cyclic flowing stream and thus the quality of the product is very carefully controlled.

Another object of the invention is to provide a method of conducting and heat exchanging exothermic chemical reactions within a single vessel wherein the reactants may be sequentially flowed into and completely mixed within a cyclic flowing stream of reaction product with immediate heat exchanging following the reaction step whereby to completely and precisely control the temperature of the reaction and thus maintain more complete control than heretofore possible over the nature of the reaction product.

Another object of the invention is to provide a reaction vessel of minimum size and maximum simplicity for conducting exothermic chemical reactions therein, wherein a large body of reaction product is maintained, as well as a cyclic flowing stream thereof, means being provided for sequential adding and mixing of the reactants to the cyclic flowing reaction product stream as well as means for providing effective, complete heat exchange of the reaction product stream after the reaction step.

Another object of the invention is to provide a single vessel apparatus for permitting the sequential addition of reactants to a reaction product cyclic stream and sequential mixing therein wherein one of the reactants tends to deteriorate the reaction product stream, if present in excess therein, while permitting the immediate heat exchange of the reaction product stream after the addition of the two reactants thereto.

Another object of the invention is to provide single vessel apparatus for conducting exothermic chemical reactions wherein a minimum space therein is required for heat exchanging of the cyclic reaction product stream.

Yet another object of the invention is to provide single vessel apparatus for conducting exothermic chemical reactions which will handle extremely high viscosity or high specific gravity materials or materials having a high percentage solid concentration, which will permit complete mixing of reactance therein, high speed circulation and adequate dispersion to permit complete heat exchanging thereof.

Other and further objects of the invention will appear in the course of the following description thereof.

In the drawings, which form a part of the instant specification and are to be read in conjunction therewith, an embodiment of the invention is shown and, in the various views, like numerals are employed to indicate like parts.

The term "organic sulphonic acids" is meant to include those substances in which the —$SO_3H$ or —$SO_3H$ group is attached to an organic radical and which, when neutralized, have surface-active properties and may be used as detergents, wetting, emulsifying, dispersing, penetrating agents, etc., such as, for example, sulphates and sulphonates of long-chain aliphatic hydrocarbons, higher fatty alcohols, long-chain fatty acids, polyhydric alcohol esters of fatty acids, alkyl ethers of polyhydroxy compounds, mixed aromatic and aliphatic hydrocarbons and the like.

The term "neutralizing agent" includes those substances capable of neutralizing organic sulphonic acids and may be taken from the group consisting of alkali metal and alkaline earth metal hydroxides and salts of these metals with weak acids such as carbonates and bicarbonates, aqueous ammonia, and organic bases such as the alkanolamines. It is generally preferred to employ caustic soda or soda ash as the neutralizing agent in the present invention where sodium salts are being manufactured.

The term "liquid" as used herein is intended to include within its scope true solutions, colloidal solutions and suspensions of solids in a liquid vehicle.

Figure 1:
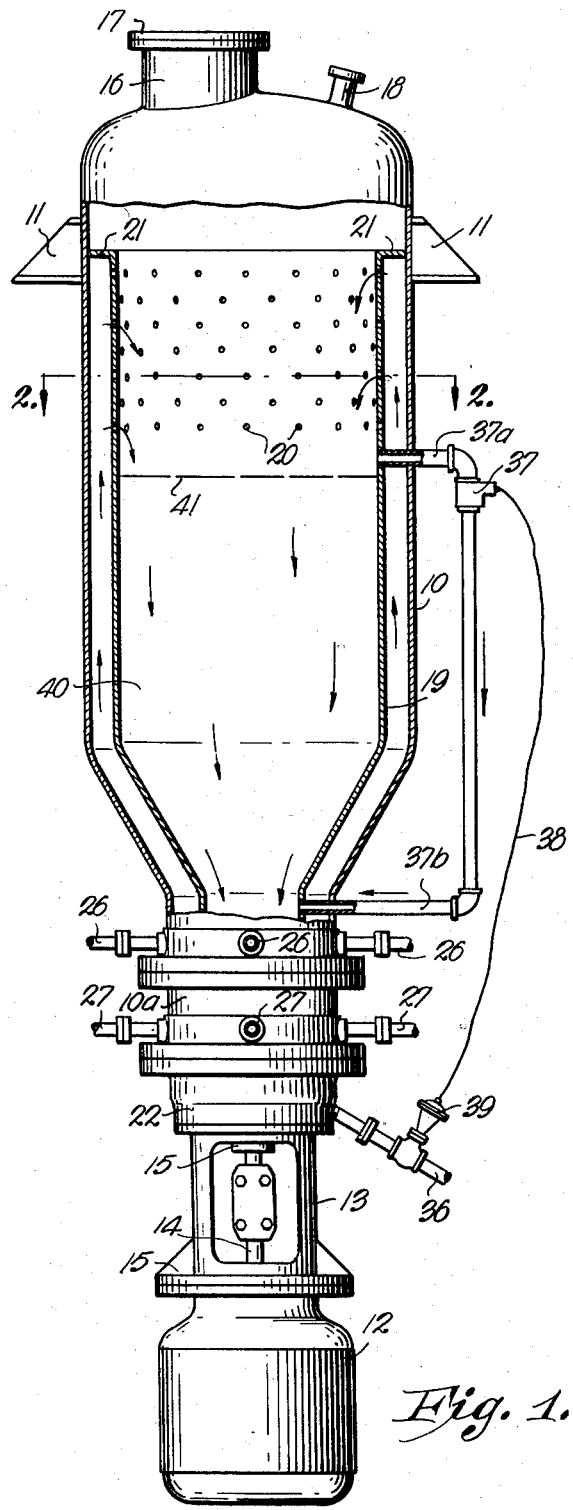
Fig. 1 is a side view with parts in section showing the inventive reaction vessel for conducting exothermic chemical reactions.
Figure 2:
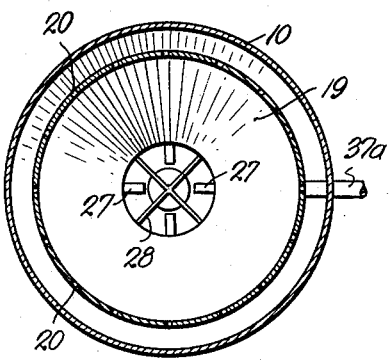
Fig. 2 is a view taken along the lines 2—2 of Fig. 1 in the direction of the arrows.

Referring to Fig. 1, therein is shown a vertical mixing vessel for conducting exothermic chemical reactions therein having an outer shell 10 which is constricted adjacent its lower end. Beam supports 11 are attached to the upper end of the vessel and serve partially to support it in its upright position. Motor 12 is fastened relative the lower end of the vessel by structural members 13 and drives shaft 14 through bearing gland 15. Hatch 16 is positioned at the top end of the shell 10 to permit feed or solids into the interior of the kettle or vessel. Hatch 16 has removable lid 17 thereon. Pressure relief pipe and vacuum connection 18 communicates to the inside of the shell 10 at the upper end thereto and is connected to a suitable suction source (not shown).

Circulating tube 19 is positioned within the outer shell 10 and runs circumferentially therein. The lower end of the circulating tube is constricted as the lower end of the outer shell. A plurality of relatively small perforations or holes 20 are formed in the circulating tube circumferentially thereof in its upper portion above the top level of the liquid body to be maintained therein as will be described. It is contemplated that such perforations or openings be in the range of one-quarter to three-quarters of an inch, but they may be larger or smaller if desired, depending upon the nature of the reaction product, the quantity of solids in the circulation, the reaction in the vessel, etc.

Circulating tube 19 is closed or walled over at its top end by horizontal wall portion 21 which closes the top of the annulus between the circulating tube and the outer shell. Any liquid circulated up through the circulating tube outer shell annulus must go through the perforations 20 to pass back into the inner portion of the vessel and circulating tube.

Figure 3:
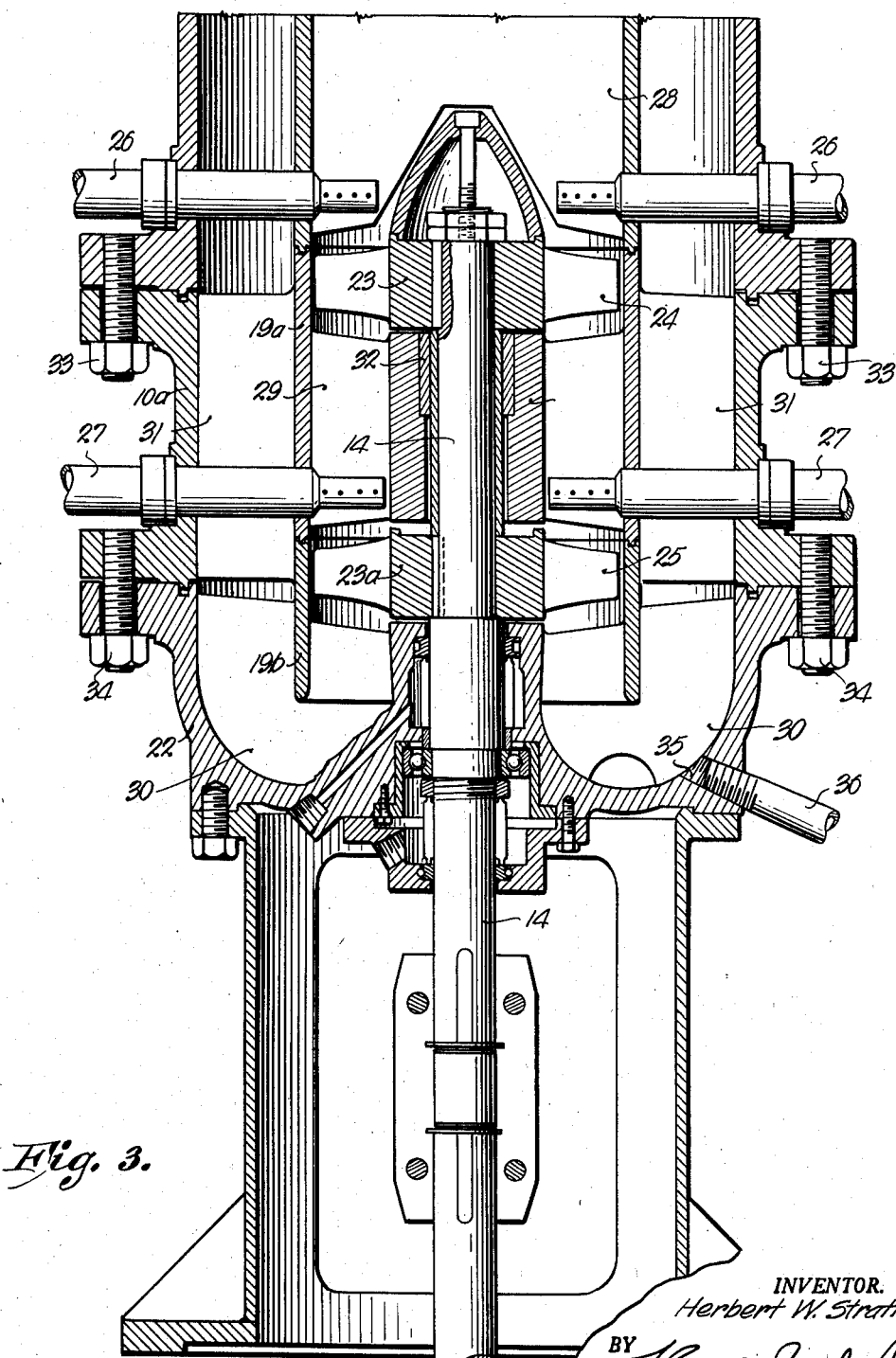
Fig. 3 is a side-sectional view through the lower portion of the reaction vessel showing the impellers and reactant input flow lines.

In Fig. 1, the hydraulic head of the vessel is shown in full view while in Fig. 3, a detailed sectional view is shown. Referring particularly to Fig. 3, the constricted portion of the outer shell and circulating tube is bottomed by hydraulic head 22. The circulating tube 19 itself terminates above the inner surface of the hydraulic head 22 so as to permit reversal of direction of liquid flowing into the hydraulic head. Hubs 23 and 23a keyed to shaft 14 carry impellers 24 and 25 respectively, both driven simultaneously by the shaft 14. The impellers are so pitched and formed as to drive liquid within the circulating tube downwardly into the hydraulic head and upwardly into the annulus between the circulating tube and the outer shell 10. A plurality of primary reactant input flow lines 26 penetrate the outer shell 10 and the circulating tube 19 to a position above the upper impeller 24 while a plurality of secondary reactant input flow lines 27 penetrate the outer shell 10 and circulating tube 19 to a position above the lower impeller 25. Upper central vanes 28 reduce turbulence above upper impellers 24, central tube vanes 29 are positioned between the two impellers and lower vanes 30 regulate turbulence in the area below the lower impellers. The circulating tube vanes 31 are positioned in the annulus between the outer shell and the circulating tube. Vanes 29 are fixed to the circulating tube 19a and carry bearing 32 which engages the shaft 14 and maintains it in centered rotating position. The circulating tube is sectioned as at 19a and 19b for convenient assembly or disassembly and the outer shell is sectioned at 10a for the same purposes. Bolts 33 and 34 join the upper shell 10 and hydraulic head 22 with the section 19a respectively.

A product withdrawal opening 35 may be positioned in the hydraulic head 22 with flow line 36 threaded thereinto. Liquid level control 37 penetrates the outer shell 10 and the circulating tube 19 and is connected by line 38 with regulating valve 39 in the flow line 36 to control the amount of product draw-off. The level of liquid in the circulating tube is maintained between the control inputs 37a and 37b.

In operation, a body of liquid 40 having its upper level 41 between inputs 37a and 37b of the liquid level control 37 is positioned within the circulating tube. Rotation of shaft 14 causes impellers 24 and 25 to drive the liquid in a cyclic flowing stream down into the hydraulic head 22 and up the annulus between the outer shell 10 and the circulating tube 19 to be discharged in fine jets or sprays from the openings 20 above the top input of the level regulator 37. Holes 20 are so sized as to break up the circulating material so vacuum withdrawal through line 18 draws off volatiles such as water or other fluids and thus heat exchanges the finely broken up cycling stream of reaction product.

As the reaction product stream is pulled down through the constricted portion of the circulating tube by the impellers, a first reactant may be input through flow lines 26 to make the product stream reactant-rich therein. Immediately upon input of this first reactant, the upper impeller 24 highly mixes and disperses it in the product stream and discharges the mixed first reactant-rich stream into the space between the two impellers. At this juncture, the second reactant is input through flow lines 27 and, before the reaction can be substantially initiated, the second impeller 25 highly mixes and disperses the second reactant in the first reactant rich stream, thus causing a uniform, highly dispersed reaction in the product stream which is immediately whirled upwardly into the annulus and sprayed out into the space within the circulating tube to be heat exchanged. Thus, it is evident that a minimum amount of time actually elapses between the initiation of the highly dispersed reaction within the reaction product stream and the heat exchanging thereof. If desired, water or other volatiles may be added to the reacting product stream immediately before heat exchanging in the annulus or it may be added to the reaction product body before the input of the reactants so as to provide flashable material to control the temperatures of the reaction. Volatiles may as well be input through either of the product input lines to provide the flashable material.

In the neutralization of organic acids with caustic, first the caustic is input above the first impeller to make the reaction product stream rich in caustic which will not deteriorate the stream. The caustic may be water diluted to provide flashable liquid. When the organic sulphonic acid is input through the product line 27, the dispersal by impeller 25 disperses reacting reactants and the cyclic product stream is then immediately heat exchanged. In this manner, there is never an excess of sulphonic acids in the stream and the effective immediate dispersion and mixing after the input of the acids prevents hot spots, uneven reactions or strings of acid existing within the circulating reaction product stream.

It should be noted that any number of impellers can be employed with any desired number and arrangement of input flow lines.

An example of an endothermic chemical reaction employable in this method and apparatus would be the saponification of fatty acids. In this case it is necessary to apply heat and this could be done by putting a jacket on the contactor shell.

From the foregoing it will be seen that the invention is one which is well adapted to attain all of the ends and objects hereinbefore set forth together with other advantages which are obvious and inherent to the apparatus and method described.

It will be understood that certain features and subcombinations are of utility and may be employed without reference to other features and subcombinations, this being contemplated by and within the scope of the claims.

As many possible embodiments may be made of the invention without departing from the scope thereof, it is to be understood that all matter hereinabove set forth is to be interpreted as illustrative and not in a limiting sense.

Having thus described my invention, I claim:

1. A method of conducting a chemical reaction between at least two reactants comprising the steps of establishing a closed cyclic flowing stream of reaction product axially of a circulating tube, the stream passing centrally of said tube and then around its exterior surface, flowing a first one of said reactants into said stream, subjecting the first reagent-rich stream to thorough mechanical mixing, flowing a second one of said reactants into said first reagent-rich and mixed stream, subjecting the first and second reagent-rich stream to thorough mechanical mixing and subdividing the stream into a plurality of high surface exposure jets in a zone of low pressure to heat transfer the stream and flash off any volatiles therefrom during its cyclic closed flow axial of said circulating tube.

2. Apparatus as in claim 1 wherein both of the reactant inputs and both of the mixing steps take place within the circulating tube.

3. A method as in claim 1 wherein the stream is subdivided into a plurality of high surface exposure jets as it passes from the exterior of the circulating tube to the interior thereof.

4. A method as in claim 1 wherein both reactant inputs are introduced and both mixing steps take place within the circulating tube and the stream is subdivided into a plurality of high surface exposure jets as it passes from the exterior of said circulating tube to the interior thereof.

5. A method of conducting a chemical reaction between at least two reactants comprising the steps of establishing a body of reaction product centrally of a circulating tube and establishing a closed cyclic flowing stream of reaction product axially of said circulating tube, the stream passing centrally of said tube and then around its exterior surface, flowing a first one of said reactants into a first restricted cross-sectional zone in said stream, subjecting the first reagent-rich stream to thorough mechanical mixing, flowing a second one of said reactants into a second restricted crosssectional zone of said stream, subjecting the first and second reagent-rich stream to thorough mechanical mixing and subdividing the stream into a plurality of high surface exposure jets in a zone of low pressure to heat transfer the stream and flash off volatiles therefrom before it returns to the reaction product body.

6. A method as in claim 5 wherein both of the reactant inputs and both of the mixing steps take place within the circulating tube.

7. A method as in claim 5 wherein the stream is subdivided into a plurality of high surface exposure jets as it passes from the exterior of the circulating tube to the interior thereof.

8. A method of conducting a chemical reaction between at least two reactants comprising the steps of establishing a closed cyclic flowing stream of reaction product axially of a circulating tube, the stream passing centrally of said tube and then around its exterior surface, flowing said reactants into said stream, subjecting said stream to thorough mechanical mixing, and subdividing the stream into a plurality of high surface exposure jets in a zone of low pressure to heat transfer the stream and flash off any volatiles therefrom during its closed cyclic flow axial of said circulating tube.

9. A method as in claim 8 wherein the stream is subdivided into a plurality of high surface exposure jets as it passes from the exterior of the circulating tube to the interior thereof.

References Cited in the file of this patent

UNITED STATES PATENTS

| | | |
|---|---|---|
| 1,543,157 | Herzog | June 23, 1925 |
| 2,536,603 | Holmboe | Jan. 2, 1951 |
| 2,577,856 | Nelson | Dec. 11, 1951 |
| 2,635,103 | Molteni | Apr. 14, 1953 |
| 2,690,446 | Ledgett | Sept. 28, 1954 |
| 2,720,447 | Jones et al. | Oct. 11, 1955 |